United States Patent [19]

Patrikios et al.

[11] Patent Number: 4,782,990
[45] Date of Patent: Nov. 8, 1988

[54] PORTABLE GUN FOR ULTRASONICALLY WELDING WIRES

[75] Inventors: Michael Patrikios, Stratford; Guillermo Coto, Monroe; Betty Link, Stratford, all of Conn.

[73] Assignee: American Technology, Inc., Milford, Conn.

[21] Appl. No.: 67,164

[22] Filed: Jun. 29, 1987

[51] Int. Cl.$^4$ .................... B23K 20/10; B32B 31/16
[52] U.S. Cl. .................... 228/1.1; 228/44.3; 228/44.7; 228/110; 29/872; 29/873; 156/73.2
[58] Field of Search ............... 228/1.1, 110, 111, 3.1, 228/4.1, 44.3, 44.7; 156/73.2, 580.1, 296, 441; 29/872, 873

[56] References Cited

U.S. PATENT DOCUMENTS

| | | | |
|---|---|---|---|
| 3,184,354 | 5/1965 | Strother | 156/73.2 |
| 3,386,870 | 6/1968 | Morin | 228/1.1 |
| 3,657,056 | 4/1972 | Winston et al. | 228/1.1 |
| 4,032,382 | 6/1977 | Obeda | 156/73.2 |
| 4,596,352 | 6/1986 | Knapp | 228/1.1 |
| 4,646,957 | 3/1987 | Nuss | 228/1.1 |

FOREIGN PATENT DOCUMENTS 3437749 4/1986 Fed. Rep. of Germany ...... 228/110

OTHER PUBLICATIONS

"Ultrasonic Welding", American Machinist, Dec. 29, 1958, pp. 51 and 52.

Primary Examiner—Nicholas P. Godici
Assistant Examiner—Samuel M. Heinrich
Attorney, Agent, or Firm—Kramer, Brufsky & Cifelli

[57] ABSTRACT

Apparatus for ultrasonic welding of wires including a hand-held housing with an ultrasonic wave generator, a welding tip connected to said generator, an anvil for clamping the wires to be welded to said welding tip, and a tool for gathering wires disposed between said anvil and welding tips to prevent the wires from splaying during weldment.

6 Claims, 3 Drawing Sheets

PORTABLE GUN FOR ULTRASONICALLY WELDING WIRES

BACKROUND OF INVENTION

1. Field of Invention

This invention relates to a portable apparatus for the ultrasonic welding of wires.

The apparatus includes an ultrasonic welding tip, an anvil adjacent the welding tip, and compressed air driven means to gather the wire workpieces in order to maintain a tight grip around the wires during the welding process, to prevent spreading or splaying of the wires during the welding process carried out between the welding tip and anvil.

2. Description of the Prior Art

It is well-known that wires may be ultrasonically welded to one another by placing the ends of the wires in overlapping relation in a closed channel formed between an ultrasonic welding tip and a stationary support anvil and applying ultrasonic energy to the tip. The energy should be applied so that the tip vibrates parallel to the axis of the wires to be welded, to intermolecularly bond the wire ends. In order to assure that the vibrational energy is efficiently transmitted to the wires or workpiece, both the tip and the anvil have a serrated surface for holding the wires or workpiece firmly in place.

Ultrasonic welding tip technology may be found in Knapp, U.S. Pat. No. 4,596,352; Niebuhr, German Patent DE No. 31 51 151 A1; and Welter et al, U.S. patent application Ser. No. 036,477, assigned to a common assignee of the instant invention. Methods of generation of ultrasonic vibration are well-known in the prior art (e.g., U.S. Pat. Nos. 3,053,124; 3,328,610; 3,444,612; and 3,602,421). A typical frequency of vibration may be twenty to forty thousand cycles per second. A typical duration of the ultrasonic welding process in wire splicing may be 500 milliseconds.

However, typical designs of ultrasonic welding apparatus such as Stockel, U.S. Pat. No. 4,139,140; Spratt, U.S. Pat. No. 3,602,421; Welter et al, U.S. application Ser. No. 036,477 (dealing with both welding tip and welding apparatus technology) assigned to a common assignee of the instant invention, and Hawkins et al, U.S. application Ser. No. 034,848, assigned to a common assignee of the instant invention, deal with equipment which is both bulky and stationary. The workpiece must be brought to the apparatus in order to be welded. Further, the user must take separate steps in order first to gather the wires, holding them tightly between the welding tip and the anvil, and then to apply power to the ultrasonic welding apparatus to effect a weld. This may be a significant disadvantage when work is to be done "on-site" and the wires are not movable, such as in maintenance situations. This situation would require the apparatus to be portable in order to reach the workpieces at various stationary sites. Further, as some locations may be marginally accessible, it may be inconvenient for a precariously positioned user to go through multiple steps, requiring both hands, as in the prior art, in order to effect both the gathering and the welding process.

It is therefore an object of this invention to provide a self-contained, portable, ultrasonic welding apparatus which may be operated with a minimum number of controls.

SUMMARY OF THE INVENTION

In accordance with the present invention, an ultrasonic welding apparatus is provided including a portable ultrasonic converter, an ultrasonic horn having a welding tip, an anvil, a gathering tool adjacent the anvil, and a handle for carrying the components of the apparatus.

The working positions of the anvil and gathering tool are adjustable. The apparatus is attached to remote power sources by electrical and compressed air lines. The power sources in the remote unit energize the converter through electrical lines while compressed air is used to operate motors which in turn drive mechanisms to effect the relative gathering movements of the anvil and gathering tool to gather and hold the workpiece or wire ends against the ultrasonic welding tip. This configuration allows the unit to be small enough to be portably hand-held.

BRIEF DESCRIPTION OF DRAWINGS

Further objects and advantages of the invention will become apparent from the following description and claims, and from the accompanying drawings, wherein:

DETAILED DESCRIPTION OF THE PREFERRED EMBODIMENT

Figure 1:
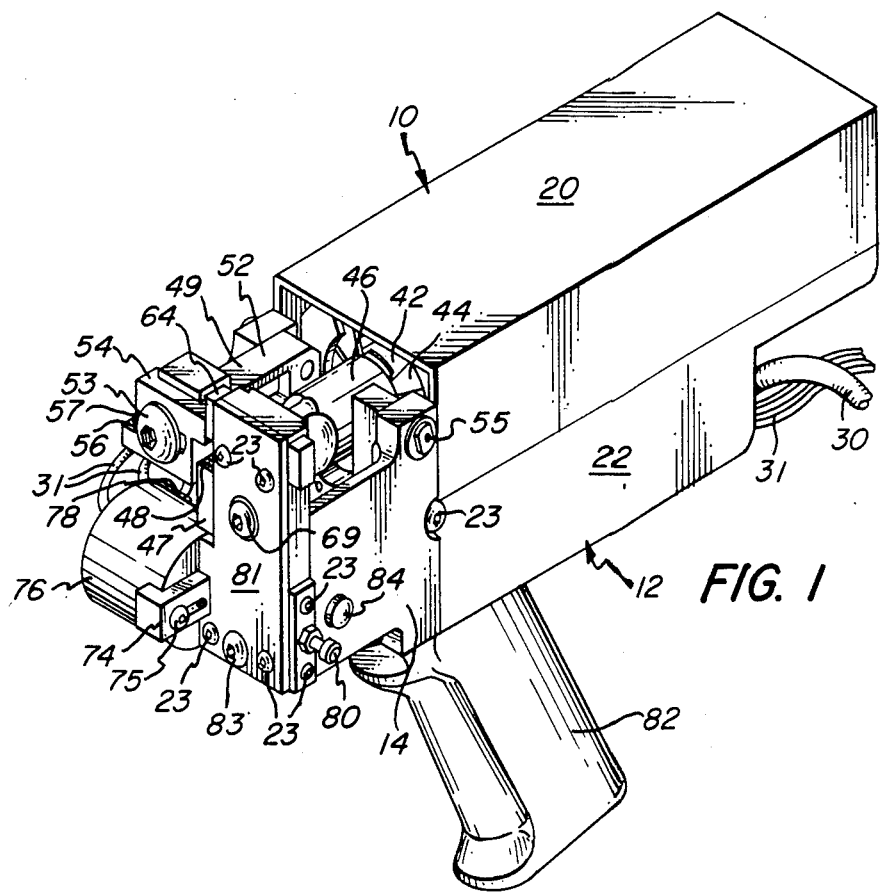
FIG. 1 is a perspective view of the portable ultrasonic welding apparatus of the present invention.

Referring now to the drawings in detail wherein like numerals indicate like elements throughout the several views, the apparatus 10 of the present invention includes a housing 12 which has a base 14 provided with spaced, parallel upright support positions, a top cover 20, and a bottom cover 22.

The bottom cover 22 is mounted beneath the base 14 while the cover 20 extends above the bottom cover 22 along contiguous sides and behind and over the upright rear portion of bottom cover 22. The preferred method of mounting the bottom cover 22 to the base 14 is by bolts or screws (not shown), while top cover 20 can be similarly mounted to bottom cover 22. Bolts 23 are representative of the mounting means used throughout apparatus 10.

The bottom cover 22 includes a pocket 24 which is adapted to hold an anvil-actuating air cylinder 26. Further, the bottom cover 22 includes an aperture 28 adapted to receive electrical lines 30 which include lines for forming a power circuit and a switch signal circuit. The bottom cover 22 include another aperture (not shown) adapted to receive therethrough air lines 31. Both the electric lines 30 and the air lines 31 are secured to a remote control unit (not shown). The base 14 includes an aperture 32 adapted to receive the piston 33 of the anvil-acutating air cylinder 26.

The bottom cover 22 includes a contact block 34 which forms a portion of rear surface of the apparatus 10 overlapped by top cover 20. The contact block 34 includes a first electric terminal 36 on its interior surface which may be energized by the electrical lines 30 forming the power circuit. The upper horizontal portion of the bottom cover 22 includes a second electrical terminal 38 which likewise may be energized by the electrical line 30 forming a power circuit. The bottom cover 22 is therefore adapted to hold an ultrasonic wave generator or converter 40 in place and to make contact thereto between the first electric terminal 36 and the second electric terminal 38. The top cover 20 clips and extends over the rear contact block 34 of bottom cover 22 thereby enclosing the ultrasonic converter 40.

The forward end of the ultrasonic converter 40 is threadably secured to an ultrasonic booster or amplifier 42. The ultrasonic booster 42 is mounted in place within the cover 20 between diaphragm 44 at its forward end and a diaphragm 45 at its rearward end, secured to a mount 16 attached to the base 14. The ultrasonic booster 42 is securely attached at its forward end to an ultrasonic welding horn 46 which is in turn integral with an ultrasonic welding tip 47 which has two serrated parallel work surfaces 48 on its top and bottom edges. The mount 16 is designed so that it may be rotated 180° about its longitudinal axis and secured to the base 14, thereby rotating a second worksurface 48 into a working position, when needed, upon wear of the first worksurface.

Figure 2:
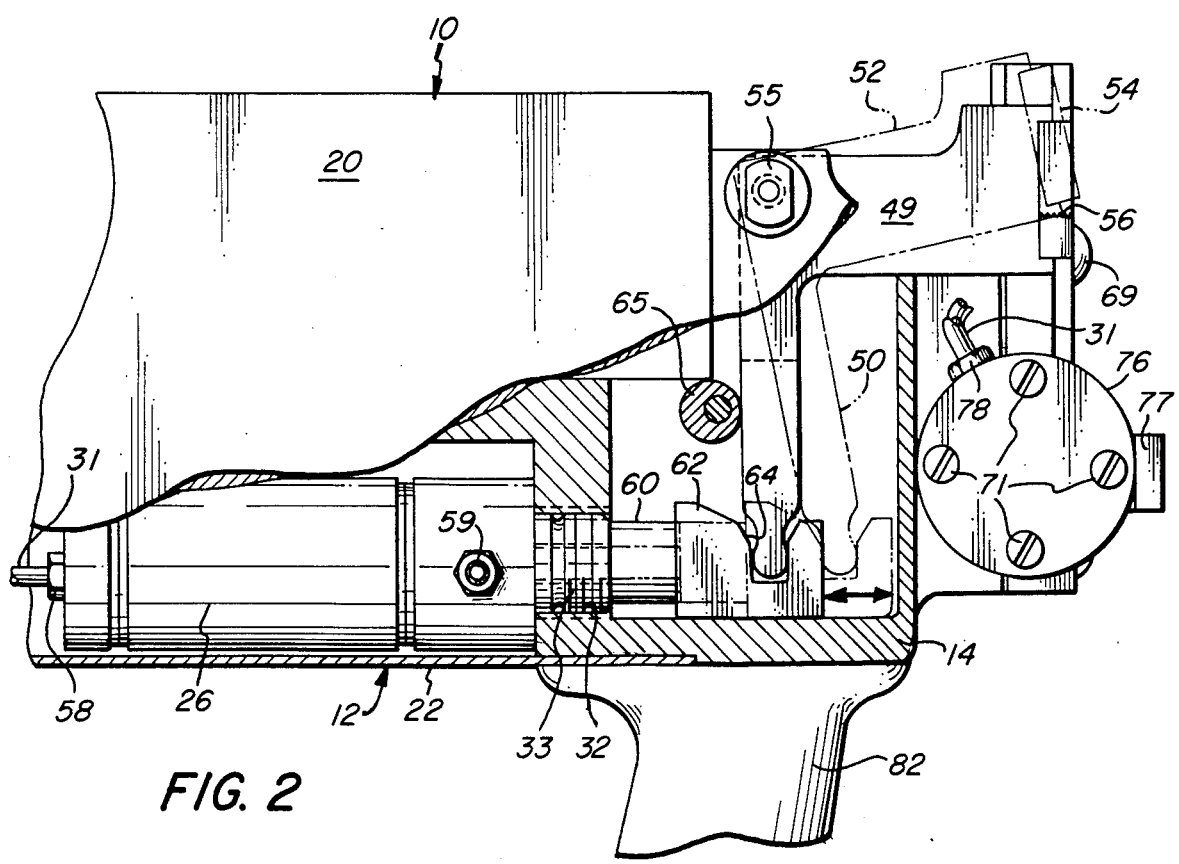
FIG. 2 is a partial side view in elevation, partly in cross-section, of the apparatus of FIG. 1, as seen from the lefthand side of FIG. 1.
Figure 3:
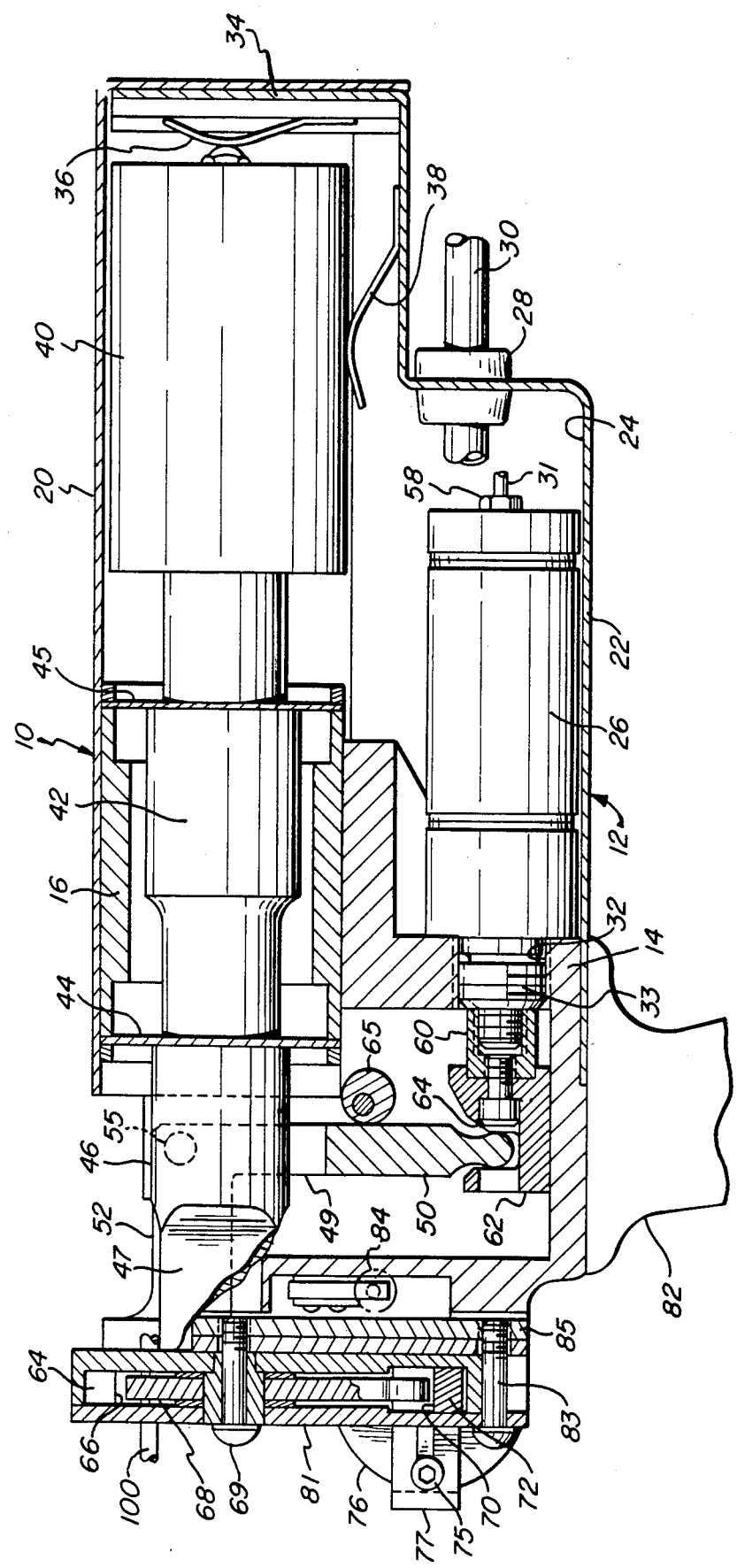
FIG. 3 is a side view in elevation, partly in cross-section, of the apparatus of FIG. 1, as seen from the righthand side of FIG. 1.
Figure 4:
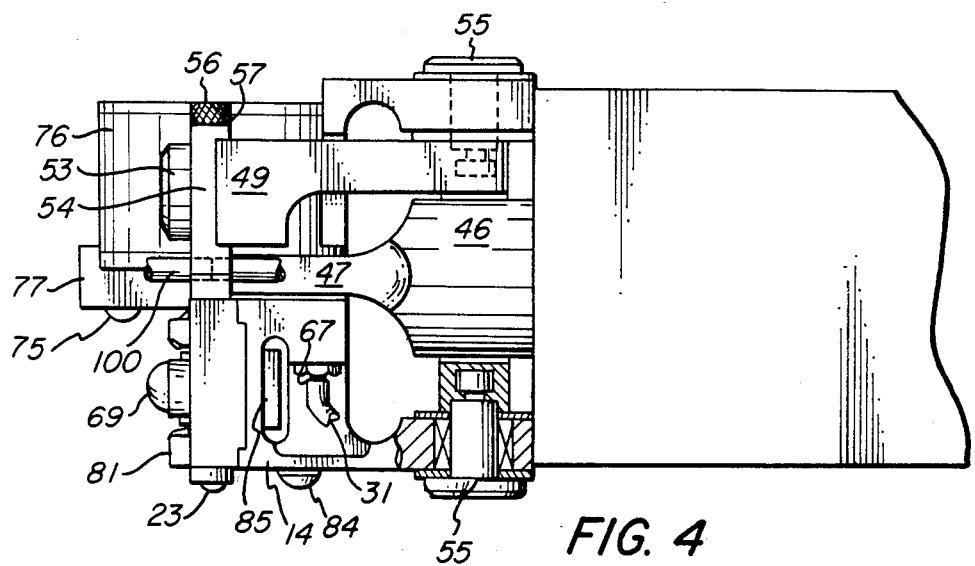
FIG. 4 is a partial top plan view of the apparatus shown in FIG. 3.

Anvil holder 49 iks L-shaped in side elevation (see FIGS. 2 and 3) with an actuating leg 50 connected to a U-shaped yoke receiving horn 46 therethrough. One arm of the yoke is connected to a working leg 52. The anvil 54 is rotatably and slidably mounted on the working leg 52 by bolt 53 so as to present two alternative serrated work surfaces 56 upon rotation adjacent a worksurface 48 of welding tip 47, each surface 56 being formed on one face of a notch 57. The intersection of one arm of the yoke connected to actuating leg 50 and the working leg 52 is pivotably mounted on an upright sidewall of base 14 by a pivot pin 55, while the other arm of the yoke is similarly pivoted by a pin 55 on a parallel, upright sidewall connected to the base. The pivoting motion of the anvil holder 49 oscillates the anvil 54 vertically across the front face of the apparatus 10 (see FIGS. 2 and 5) so as to clamp a wire workpiece or workpiece 100 against the serrated worksurface 48 of welding tip 46 (see FIG. 6).

Anvil-actuating air cylinder 26 includes two input-output fittings 58,59, each of which is connected to an air line 31. Pressurization of fitting 58 extends piston 33, driving air beneath the piston head in cylinder 26 out through fitting 59. Pressurization of fitting 59 retracts piston 33, expelling air above the piston head out of fitting 58. Piston 33 extends through aperture 32 of an upright portion of base 14 and threadedly engaged rod end adapter 60 which, in turn, is threadedly connected to a slide 62. Slide 62 includes a notch 64 receiving the lower ball-shaped end of the actuating leg 50 of the yoke of the anvil holder 49. This translates the linear movement of the slide 62 to oscillating motion of anvil holder 49 carrying the anvil 54 by rocking the leg 50 causing the yoke arms to pivot about pins 55, causing the anvil 54 to move in and out of working position. The vertical component of the working position of the anvil holder 49 and, in turn, the final vertical position of anvil 54 is adjusted by rotating an eccentric rod 65 in contact with the rear of leg 50 thereby adjustably limiting the rear movement of slide 62 and the arc of the oscillatory movement of anvil holder 49. Rod 65 is mounted by bolts 23 between the parallel side plates of base 14 which also receive pivot pins 55.

Figure 5:
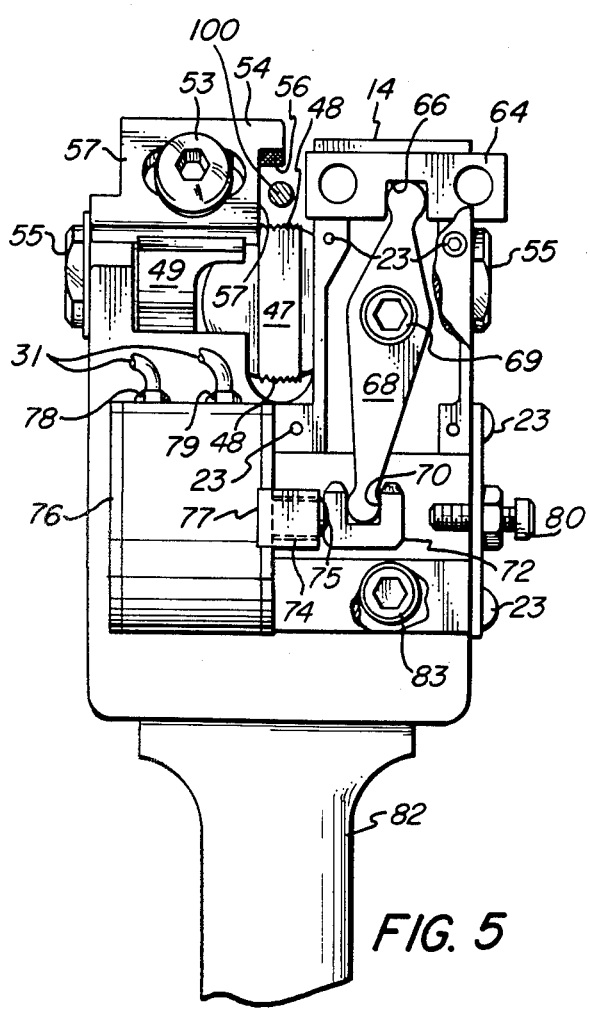
FIG. 5 is a front view in elevation of the apparatus of FIG. 1, with a front cover plate removed illustrating the gathering tool and the anvil in their open position.
Figure 6:
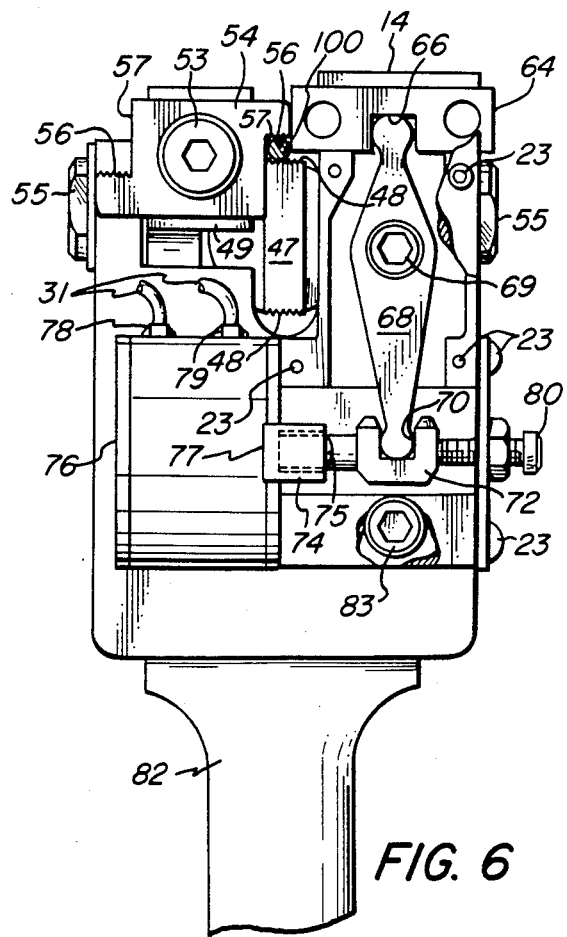
FIG. 6 is a view similar to FIG. 5 with the gathering tool and the anvil in their closed or working position.

Gathering tool 64 is slidably mounted in a rectangular slot at the top of a first upright portion of base 14, allowing gathering tool 64 to slide horizontally so as to abut the anvil 54 in working position, as shown in FIG. 6. Gathering tool 64 includes a downwardly opening notch 66 which is adapted to receive one rounded end of gathering tool rocker arm 68 which is pivotably mounted on the upright portion of base 14 by bolt 69. Gathering tool rocker arm 68 has a second rounded end adapted to engage in an upwardly opening notch 70 in a U-shaped piston rod end 72. Gathering tool piston rod end 72 is securely fastened to piston 74 of a gathering tool actuating air cylinder 76. This allows the reciprocating linear movement of piston 74 to be translated into opposite linear movement of gathering tool 64 through the intermediate pivotal motion of rocker arm 68. Gathering tool actuating air cylinder 76 is attached to base 14 and rear stop 77 for piston rod end 72 by screws 71 and bolt 75. The movement of piston 74 is effective by gathering tool actuating air cylinder 76 which includes fittings 78 and 79 for air lines 31. Pressurization of fitting 78 extends piston 74 outwardly from the gathering tool actuating air cylinder 76 expelling air through fitting 79 beneath the piston head, thereby moving gathering tool 64 into working position as shown in FIG. 6 abutting anvil 54 while pressurization of fitting 79 retracts piston 74 expelling air through fitting 78 from the gathering tool actuating air cylinder 76, retracting gathering tool 64 into its open position, as shown in FIG. 5. The working position of gathering tool 64 may be limited or adjusted by the position of the gathering front stop screw 80 rotatably fixed to an upright side wall of base 14 thereby limiting the movement of gathering tool piston rod end 72. The gathering tool rocker arm 68, gathering tool piston rod end 72 and piston 74 are covered by slide cover 81 which is held in place by bolts 23, 69 and 83. Bolts 69 and 83 extend through the slide cover 81 and an upright portion of base 14.

A handle 82 is attached to the bottom of base 14. Switch button 84 is mounted on one of the side walls of base 14 in such a position so as to allow the user to reach switch button 84 while holding handle 82. Those skilled in the art will realize that a footswitch (not shown) may be substituted for switch button 84, which upon activation, will cause energization of the converter 40 to effect a weldment at tip 48. A footswitch can also be used to pressurize the various air lines 31 at the fittings 58,78, while opening of the switch can pressurize fittings 59,79. Pressurization of fittings 58 and 78 will move the anvil 54 and the gathering tool 64 into working position so as to hold the workpiece 100 firmly against the worksurface 48 of the ultrasonic welding tip 47. Acutation of converter 40 will cause the ultrasonic tip 47 of horn 46 to vibrate thereby effecting welding of the workpiece (e.g., overlapped wire ends) through intermolecular bonding.

What is claimed is:

1. A portable ultrasonic welding apparatus for welding wires together comprising:
   a housing,
   a handle connected to said housing,
   said housing including
   ultrasonic means for welding wires together having a welding tip,
an anvil for clamping the wires to be welded to said welding tip,
means for gathering the wires to be welded between said anvil and welding tip to prevent the wires from splaying during the welding operation,
means connected to said anvil for changing the position of said anvil relative to said welding tip from an open position for the receipt of wires to be welded between said anvil and welding tip to a working position clamping said wires to be welded between said anvil and welding tip,
said position changing means connected to said anvil further including
a horizontal arm connected to said anvil,
a vertical rocker arm connected to said horizontal arm,
means pivotably mounting said horizontal and vertical arms at the intersection thereof for oscillating said anvil, and
motor means pivotably connected to said vertical rocker arm for rotatably driving said rocker arm about said pivotable mounting means to oscillate said horizontal arm and anvil relative to said welding tip.

2. The apparatus of claim 1 including means for limiting the movement of said anvil relative to said welding tip, said limiting means including:
a rotatable, eccentrically mounted shaft adapted to be placed in abutment with said vertical rocker arm during rotation of said rocker arm by said motor means.

3. A portable ultrasonic welding apparatus for welding wires together comprising:
a housing,
a handle connected to said housing,
said housing including
ultrasonic means for welding wires together having
a welding tip,
an anvil for clamping the wires to be welded to said welding tip,
means for gathering the wires to be welded between said anvil and welding tip to prevent the wires from splaying during the welding operation,
means connected to said gathering means for moving said gathering means towards and away from said anvil and welding tip, said gathering means further including
a horizontal slide adapted to abut said anvil above said welding tip, and
said means for moving said gathering means including
a vertical rocker arm having a first end pivotably connected to said horizontal slide, and
motor means pivotably connected to a second end of said rocker arm for pivotably driving said rocker arm to move said slide towards and away from said anvil and welding tip.

4. The apparatus of claim 3 wherein said position changing means connected to said anvil includes:
a horizontal arm connected to said anvil,
a vertical rocker arm connected to said horizontal arm,
means pivotably mounting said horizontal and vertical arms at the intersection thereof for oscillating said anvil, and
motor means pivotably connected to said vertical rocker arm for rotatably driving said rocker arm about said pivotable mounting means to oscillate said horizontal arm and anvil relative to said welding tip.

5. The apparatus of claim 3 including means for limiting the movement of said gathering means towards said anvil and welding tip, said limiting means including:
a stop in the path of movement of said motor means for limiting the driving movement of said motor means and rotation of said rocker arm connector to said slide.

6. The apparatus of claim 5 including means for adjusting the relative fixed position of said stop relative to said motor means.

* * * * *